United States Patent
Nasr et al.

(10) Patent No.: US 6,438,540 B2
(45) Date of Patent: Aug. 20, 2002

(54) AUTOMATIC QUERY AND TRANSFORMATIVE PROCESS

(75) Inventors: Roger I. Nasr, Austin; Neil Webber, Round Rock, both of TX (US)

(73) Assignee: Vignette Corporation, Austin, TX (US)

( * ) Notice: Subject to any disclaimer, the term of this patent is extended or adjusted under 35 U.S.C. 154(b) by 0 days.

(21) Appl. No.: 09/884,230

(22) Filed: Jun. 19, 2001

Related U.S. Application Data

(63) Continuation of application No. 09/134,263, filed on Aug. 14, 1998, now Pat. No. 6,263,332.

(51) Int. Cl.[7] .............................................. G06F 17/30
(52) U.S. Cl. ............................. 707/3; 707/10; 707/103
(58) Field of Search ......................... 707/23, 6, 7, 103, 707/10, 102, 4, 5, 104.1; 717/5; 706/11

(56) References Cited

U.S. PATENT DOCUMENTS

| | | | |
|---|---|---|---|
| 4,769,772 A | * 9/1988 | Dwyer ........................... 707/2 |
| 5,138,615 A | 8/1992 | Lamport et al. ............. 370/400 |
| 5,649,186 A | 7/1997 | Ferguson ...................... 707/10 |
| 5,655,130 A | 8/1997 | Dodge et al. ................ 707/511 |
| 5,752,021 A | 5/1998 | Nakatsuyama et al. ......... 707/5 |
| 5,778,400 A | 7/1998 | Tateno ......................... 707/513 |
| 5,875,334 A | * 2/1999 | Chow et al. .................... 717/5 |
| 5,875,441 A | 2/1999 | Nakatsuyama ................. 707/1 |
| 5,893,109 A | 4/1999 | DeRose et al. ............. 707/104 |
| 5,920,879 A | 7/1999 | Kyojima et al. ............. 707/517 |
| 5,940,822 A | 8/1999 | Haderle et al. ................. 707/3 |
| 5,940,842 A | 8/1999 | Sakuta ........................ 707/513 |
| 5,956,726 A | 9/1999 | Aoyama et al. ............. 707/102 |
| 5,970,490 A | * 10/1999 | Morgenstern ................. 707/10 |
| 6,009,436 A | 12/1999 | Motoyama et al. .......... 707/102 |
| 6,012,098 A | 1/2000 | Bayeh et al. ................ 706/246 |
| 6,018,710 A | 1/2000 | Wynblatt et al. ............ 704/260 |
| 6,023,714 A | 2/2000 | Hill et al. .................... 707/513 |
| 6,047,280 A | 4/2000 | Ashby et al. ................... 707/2 |
| 6,052,693 A | * 4/2000 | Smith et al. .............. 707/104.1 |
| 6,055,538 A | 4/2000 | Kessenich et al. .......... 707/101 |
| 6,072,801 A | 6/2000 | Wood, Jr. et al. ........... 370/437 |
| 6,098,071 A | 8/2000 | Aoyama et al. ............. 707/102 |
| 6,108,676 A | 8/2000 | Nakatsuyama .............. 707/522 |
| 6,128,617 A | 10/2000 | Lowry ......................... 707/100 |

FOREIGN PATENT DOCUMENTS

EP      0601 550 A2     7/1993       G06F/15/403

OTHER PUBLICATIONS

Marden, Philip, And Munson, Ethan, "Multiple Presentations of WWW Documents Using Style Sheets," Proceedings of the Workshop on New Paradigms in Information Visualization and Manipulation, Nov. 10–14, 1997, pp. 75–78.

"Microsoft Press Computer Dictionary Third Edition," Definition of the word 'tree,' 1997, p. 477.

(List continued on next page.)

*Primary Examiner*—Diane D. Mizrahi
(74) *Attorney, Agent, or Firm*—Gray, Cary, Ware & Freidenrich

(57) ABSTRACT

A computer-implemented method of retrieving information in a first markup language through a query engine and presenting the information in any required markup language. A user inputs a query and may invoke a number of transformative sequences. These sequences contain a markup language pattern and an action, which may include transforming the tags in the first markup language to tags in a different markup language. The appropriate transformative sequence is selected and the pattern from the transformative sequence is compiled. The compiled pattern is used to perform rapid and efficient searches of documents in the database. A predicate check using the binary coding of the node as well as ancestor information confirms the node. The leaf information associated with a confirmed node is then stored. If necessary, the action from the transformative sequence is applied to change the markup language of the leaf information to that of the user.

14 Claims, 7 Drawing Sheets

OTHER PUBLICATIONS

Lee, Y.K., Yoo, S–J, and Yoon, K. "Index Structures for Structured Documents," Proceedings of the First ACM International Conference on Digital Libraries, Mar. 20–23, 1996, pp. 91–99.

Aho, A.V., Hopcraft, J.E., and Ullman, J.D. "Data Structures and Algorithms," Reading, Addison Wesley, 1983. pp. 78–82. QA76.9.D35A38.

Thompson, Henry S.: "An Introduction to XSL: Slides from a talk to SGML UK" from http://www.ltg.ed.ac.uk/~ht/swindon.html. Oct. 27, 1997, Sections 5,6,9.

Lee, Yong Kyu: "Querying Structured Documents." System Sciences, 1996. Proceedings of the Twenty–Ninth Annual Hawaii Conference on System Sciences, vol. 2, pp. 155–164.

* cited by examiner

FIG. 6

ⓥ PARTNERS company | news | product | support | partners | feedback

VIP PROGRAM

StoryServer 3

The Vignette Internet Partner programs revolve around the power, speed, and flexibility StoryServer 3 brings to site development and management. The most popular Web content application system among the top 100 Web sites, StoryServer now offers complete content management capabilities including integrated workflow to facilitate and improve customer and production team management.

- developer program
- affiliate program
- var program
- storyserver3
- current partners
- vip online
- application contact info
vipinfo@vignette.com
Vignette Corporation
3410 Far West Blvd
Suite 300
Austin, Texas 78731
512 502-0223
888 608-9900 toll-free
512 502-0280 Fax
info@vignette.com site development and management

The component-based dynamic architecture of StoryServer 3 accelerates site development, improves site integrity, and simplifies maintenance to offer unprecedented scalability, efficiency, and integrity for sites of any size.

Accelerates Site Development
>>Storyserver 3 treats the functional elements of your site-any combination of content, format, and application logic-as individual components easily reused across the site.
>>Individual components can be built and managed independently, enabling editors, designers, and programmers to work without cross-team bottlenecks.

Delivers Smart Content™
>>User interactions with Web site 3/4 such as requests for product info and support-are integrated into existing business processes through customized workflow.
>>Provides true integration of Web site content with business processes.

Facilitates Browser Management
>>Integrated recognition of requesting browser characteristics simplifies design for multiple browser types through component-based customization of application logic, content and design elements.
>>Recognition of over 30 browser attributes are built-in with support for additional user-defined attributes.

Increases Site Integrity
>>Virtual link management automatically maintains additions and deletions to existing links.
>>Enables site builders to focus on content rather than administration.

Simplifies Maintenance
>>Browser interface enables non-technical and/or remote users to modify content.
>>Automates deployment and expiration of content.

Rationalizes Asset Management
>>Changes to a specific asset flow through to all components that reference the asset

```
<xsl>                                          /800
    <rule>                                     /810
        <!--Pattern-->                         /820
            <element type="book">              /860
                <any>
                    <element type="chapter">   /850
                        <any>
                            <target-element type="title"/>  /840
                        </any>
                    </element>
                </any>
            </element>
        <!--Action-->                          ~830
            <H4>
                <stuff/>                       ~870
            </H4>
    </rule>
</xsl>
```

AUTOMATIC QUERY AND TRANSFORMATIVE PROCESS

This application is a continuation of application Ser. No. 09/134,263, filed on Aug. 14, 1998, now U.S. Pat. No. 6,263,332.

TECHNICAL FIELD

This patent application is related, in general, to information retrieval and in particular to a query and transformative engine applicable to eXtensible Markup Language (XML) documentation.

BACKGROUND

As society becomes increasingly more computerized and as greater access is allowed to information stored on computers, it has become increasingly more important to find such information in as efficient a manner as possible.

For example, the development of computerized information resources, such as the Internet, and various on-line services, such as Compuserve, America Online, Prodigy, and other services, has led to a proliferation of electronically available information. In fact, this electronic information is increasingly displacing more conventional means of information transmission, such as newspapers, magazines, and even, television. The World Wide Web consists of a number of Web sites located on numerous servers, most of which are accessible through global computer networks. The primary issue in all of these resources is filtering the vast amount of information available in order that a user obtain that information of interest to him and receiving such information in an acceptable format. To assist in searching information available on the Internet, a number of search techniques have been devised to find information requested by the user.

These search techniques are based upon a node by node search. When the node does not contain "speech" (defined as viewable material for the reader), the search will navigate to the first child of the node and keep on navigating down each node string until speech is found. By being forced into examining each node separately, such searches are time and resource consuming.

In addition, none of these search techniques incorporate a transformative sequence for adjusting the information to the requirements of the user.

There is a need in the art to develop a query system that is easy to use and intuitive. There is an additional need to combine such a query engine with a transformative sequence to allow documents to be presented to users in the format they require.

SUMMARY OF THE INVENTION

A computer-implemented method of retrieving information in a first markup language through a query engine and presenting the information in any required markup language is shown. A user inputs a query to achieve one of two possible outputs: In the first usage, a query stands alone and the output of the engine is the information matching the query. In the second usage, transformative sequences are combined with queries. These sequences contain a markup language pattern and an action; the action may include transforming the tags in the first markup language to tags in a different markup language. The output of the engine in this second case is information matching the queries and transformed by the sequences specified. In either usage, the query is compiled from its source format into a sequence of instructions for the query engine. The compiled query is assigned tags and attributes. The database is then searched node by node for the corresponding tags and attributes. A predicate check using the binary coding of the node as well as ancestor and descendant information confirms the node. The leaf information associated with a confirmed node is then stored. If necessary, the action from the transformative sequence is applied to change the markup language of the leaf information to that of the user.

A primary object of the invention is to provide a query engine capable of making partial searches and conducting predicate checks on such searches.

Yet another object of the present invention is to provide an abstract engine with both query and transformative capabilities to access a document and transform it to a requisite format.

It is still another object of the invention to provide a query engine that can produce more than one result on demand.

It is another object of the invention for the query engine to be state-preserving so that the engine can reactivate a prior search.

An object of the invention is to execute XML tag-level search and retrieval.

Furthermore, another object of the invention is to provide an engine that can both process a query and validate the results efficiently.

A further object of the invention is for the transformative engine to present the XML scripted document in HyperText Markup Language (HTML), Handheld Devices Markup Language (HDML), and other presentation formats.

Another object of the invention is to access XML tag-level scripting and perform eXtensible Style Language (XSL) ready transformation on such scripting.

BRIEF DESCRIPTION OF THE FIGURES

For a more complete understanding of the present invention and the advantages thereof, reference should be made to the following Detailed Description taken in connection with the accompanying drawings in which:

FIG. 6 is an example page of a Web site;

DETAILED DESCRIPTION

Figure 1A:
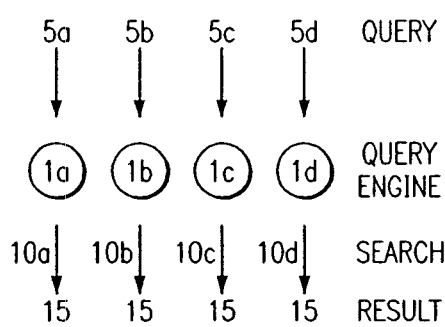
FIG. 1A is a diagram illustrating the prior art implementation of conducting searches.
Figure 1B:
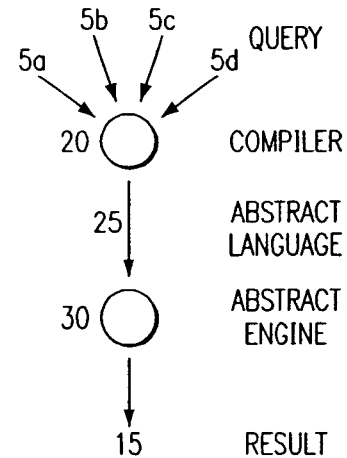
FIG. 1B is a diagram illustrating the implementation of conducting a search using an abstract engine.

In the context of an electronic environment, a document is stored using a markup language. A markup language defines the descriptions of the structure and content of different types of electronic documents. There is a need to be able to search such electronic documents to obtained needed information. In the prior art, as shown in FIG. 1A, a single query engine would not be able to handle query requests in a number of differing languages. It would take a number of query engines 1a, 1b, 1c, and 1d receiving similar search requests, in a number of differing languages, 5a, 5b, 5c and 5d, to compile and generate a number of differing searches, 10a, 10b, 10c, and 10d, in order to obtain a search result 15. In an embodiment shown in FIG. 1B, compiler 20 may receive a number of similar search requests in a number of differing languages, 5a, 5b, 5c, and 5d. The compiler 20 compile the search request 20 from any of the languages into the abstract engine language 25 and then have the abstract engine 30 run the search to obtain search result 15. The advantage is that the abstract engine can support any number of query languages. The prior art cannot support a number of query languages and would have to implement separate search engines for the separate languages. This provides the user of the abstract engine with a memory advantage. The abstract engine can be used in a network in an electronic environment or on a stand-alone console.

Figure 1:
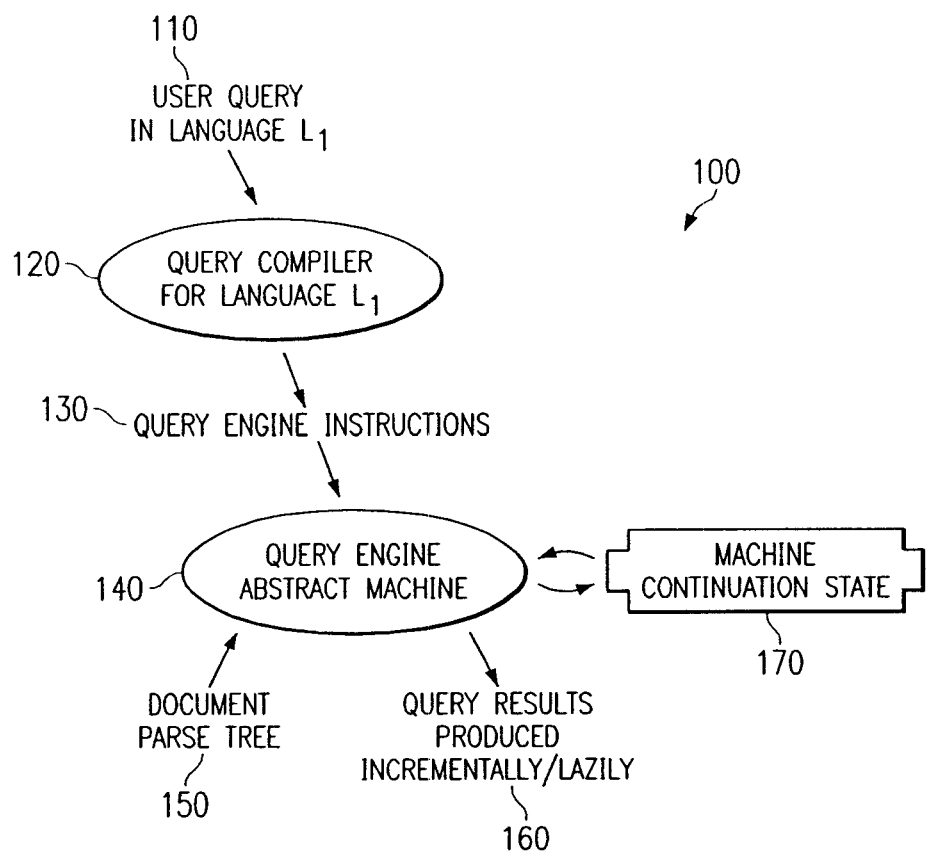
FIG. 1 is a relationship diagram showing the Query Engine components.

FIG. 1 is a relationship diagram 100 showing the primary elements of the search engine of the present patent application. A user generates a user query 110 in language $L_1$. The query is then compiled in a query compiler 120 for language in language $L_1$. The Query Engine Abstract Machine 140 takes as input the following: Query Engine Instructions 130 and a Document Parse Tree 150 representation of a document. The query engine instructions tell the query engine what parts of the document parse tree to select and return as Query Results 160. In addition to Query Results 160, the other output of the query engine is the Continuation State 170. In cases where multiple query results would be produced by the query engine by following the query engine instructions, the query engine only produces the first result and outputs the intermediate engine state as the Continuation State 170. At a later time, the Continuation State may be supplied back to the engine to cause it to resume operation at the saved state and produce the next result.

Figure 2:
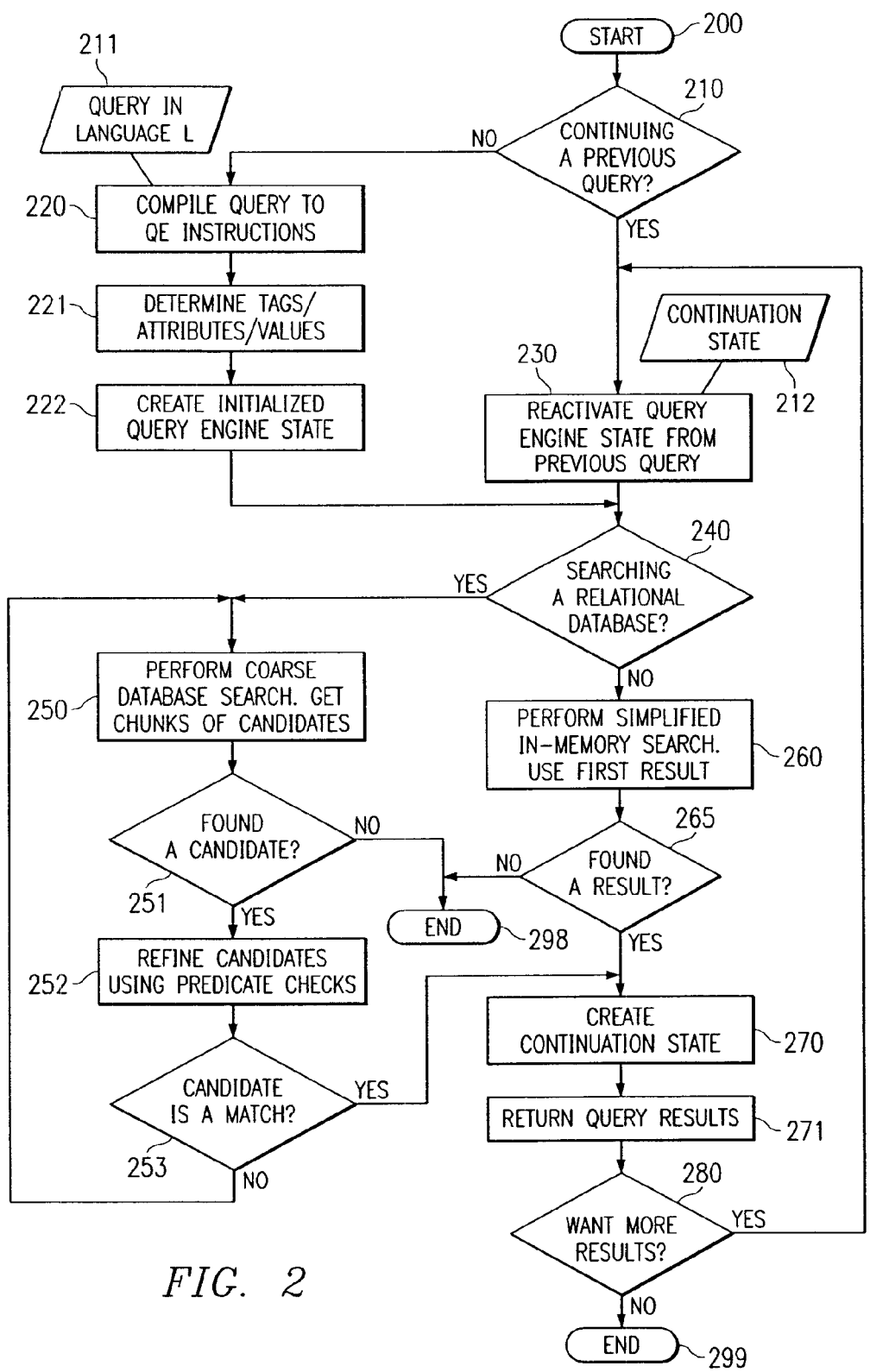
FIG. 2 is a detailed flowchart of the Query Engine.

FIG. 2 is a flowchart 200 showing the query engine in more detail. The process can start with a new query, or with the Continuation State of a previous query. There are two different paths 210 for these two cases. If this is a new query, the user inputs a Query 211 in one of the Query Languages understood by the engine. A typical query might look like:

<title>under<chapter>under<play name="hamlet">

Such a typical query would, for example, be addressed at an electronic database containing the works of a number of authors. The objective of the query is to find all the chapter title headings for any plays entitled "Hamlet."

As noted earlier, the engine can support any number of query languages, because the processing steps are the same for all languages, this description uses "L" as a generic variable indicating any query language understood by the engine.

The engine compiles the query language into query engine instructions 220. In the next step 221, specific tag names and attributes are attached to the instructions as required to correctly describe the query. In the example query shown above, the tags are <title>, <chapter> and <play>, "name" is an attribute name, and "hamlet" is an attribute value. An initialized query engine internal state is then created at step 222.

If instead of being a new query this is a resumption of a previously run query, the query is resumed using the Continuation State 212 from the previously processed query. The appropriate query engine internal state is then reactivated 230.

In either the new or resumed query case, the engine now determines 240 if the user desires to search documents in a relational database, or in memory.

Figure 4:
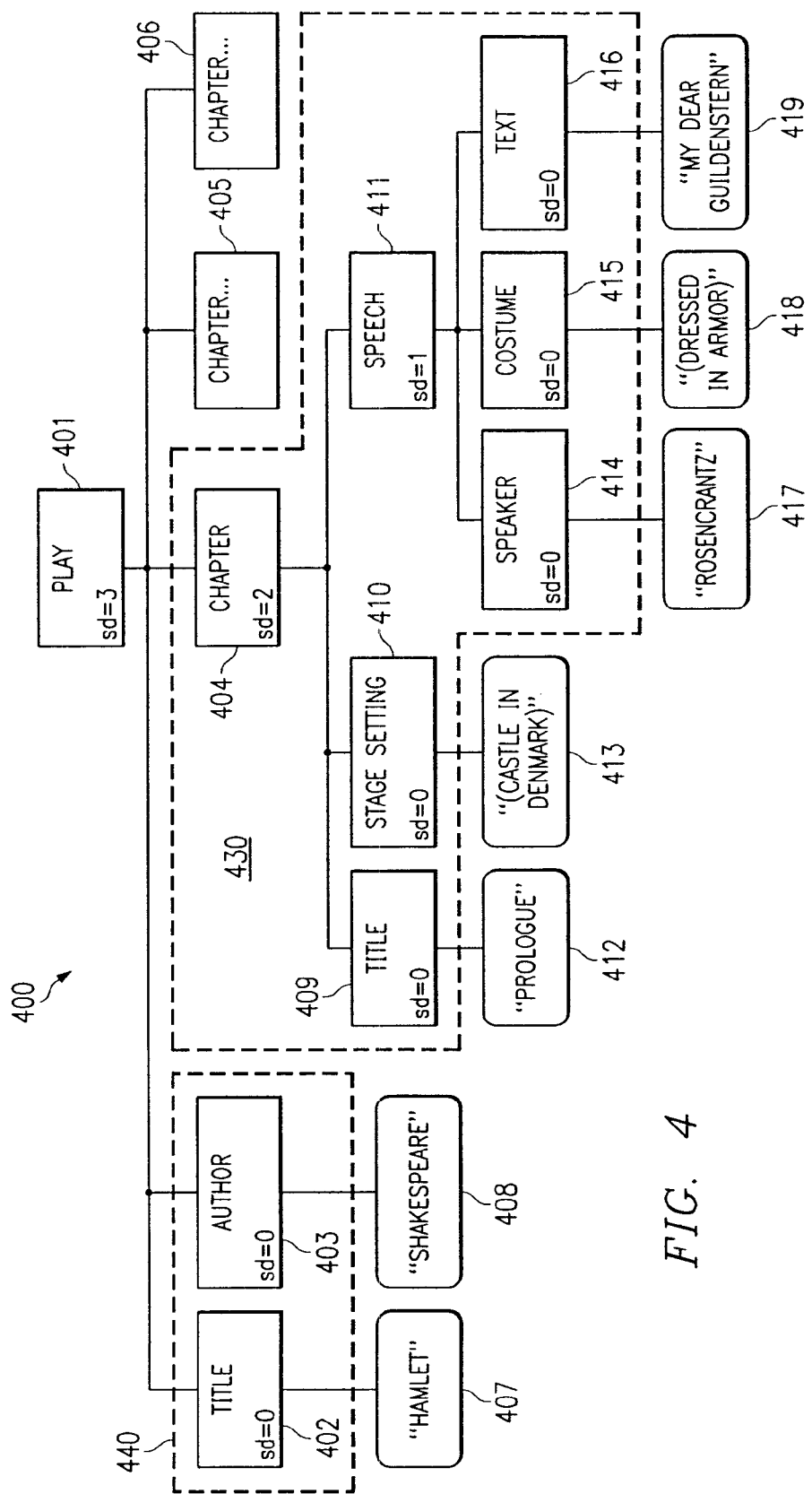
FIG. 4 is an illustration a document tree with binary coding assignments.

When searching a relational database, the engine performs a coarse search 250 of the database, executing query engine instructions and looking for matches based on the tags/attributes/values assigned to the instructions in step 221. This produces a candidate list of possible matches for the query. In this search, the engine does not search the entire database, but rather stops once it has accumulated a partial set of results. This method is more efficient because it allows the query engine to use less memory when searching. For illustrative purposes, FIG. 4 shows an example of a document tree as 400. The <title> of the play 401 is "Hamlet" 407, and the <author> 403 is "Shakespeare" 408. One <chapter> 404 has a <title> 409 of "Prologue" 412. The <stage setting> 410 includes a "(Castle in Denmark)" 413. The chapter <404> also has <speech> 411. The <speaker> 414 includes "Rosencrantz" 417, the "costume" 415 includes "(Dressed in Armor)" 418, and the <text> 416 includes "My Dear Guildenstern" 419.

As the search engine travels from node to node of the document tree, the search engine determines whether the contents of the node may partially fulfill the search requirement based on the coarse search criteria 251. This is determined based only on the tags and attributes in the instructions obtained during the compilation 221. In this particular example, the tag is <title>. For example, in FIG. 4, there are multiple instances of <title> 402 and 409. During the coarse search the search engine may find any of these <title> nodes based on a tag match. However, <title> node 402 will be checked (as explained later) and discarded because it is not a <title> under a <chapter> under a <play>; instead, it is a <title> directly under a <play> 401. The search engine will continue its search until it encounters node 409, which satisfies all the tag and attribute criteria and additionally satisfies the predicate checks, as will be described later. The text information to node 409 is "Prologue" which is the leaf information 412.

If no candidates at all are found 251, the engine is finished 298 and no more results are returned. Otherwise, the candidate list is further refined using predicate checks 252, details of which will be described later. If the refinement finds no matching candidates 253, then the engine returns to the database and searches for additional candidates 250.

If the refinement finds a match 253, the engine is ready to generate its two outputs: the Query Results 271 and the Continuation State 270. As noted earlier, the Continuation State describes the current state of the engine, so that a later invocation may resume the search at the point where the current operation left off. For example, in FIG. 4, the search engine can return the correct <title> node 409 as well as any additional <title> nodes found under the Chapter nodes 405 and 406 (which are not fully elaborated in the FIGURE). The first result will be presented first, and the user indicates when to resume processing 280, at which time the entire process begins again at step 230, with the Continuation State supplied as input 212. Otherwise, the process reaches an end 299.

Returning to step 240, the other method of searching is for documents that are not stored in a relational database and instead are contained completely in memory. These documents can be searched much more efficiently than database documents, and so the query engine uses a different path. A simplified search for the proper query results is performed 260 on the document directly in memory. As with the database case, only the first results are used. If no results are found 265, the query engine is finished. Otherwise, the engine proceeds directly to create the Continuation State 270 and the query results 271.

The benefits of the tag, attribute, and attribute value checking mechanism is that it provides a less memory intensive manner of conducting a query since the search is merely looking for simple word associations as opposed to placement of the node in relation to other nodes. This partial checking mechanism 250 allows a much more efficient implementation when searching documents stored in a relational database or in any non-memory resident form, which is important for large documents. To complete the search query, however, the engine must refine the coarse results to eliminate incorrect matches such as the case of a <title> 402 directly under a <play> 401. This requires a descendant predicate check. Typically, such a check on a number of documents and a large number of nodes would consume a great deal of time and resources, especially in an electronic environment. It therefore becomes preferable to devise a constant time method to determine if an element is a descendant of another. The preferred embodiment is a unique binary encoding mechanism and corresponding descendant predicate algorithm to perform such a predicate check operation. In order to determine whether node A is a descendant of node B, this operation will require three pieces of information (1) the identification of the immediate parent, (2) the absolute depth of the node, and (3) binary encoding.

To explain the preferred embodiment of the binary coding mechanism used by the query engine, the following terms must be defined: newcode(), subtree depth, and absolute depth.

C=newcode(Cp) creates a new binary code, C, from the code, Cp, of the parent, P. The new code must have the property that for any two nodes, A and B, with codes Ca=code of node A and Cb=code of node B, the following relationship $$(Ca \& Cb)=Cb$$

where "==" indicates equality, and "&" indicates bitwise binary AND is true IF AND ONLY IF node A is a descendant of B, "descendant" being meant in the most general sense, not limited only to immediate descendants.

The subtree depth of a tag node is defined as follows:
the subtree depth of a leaf tag, meaning a tag node with no descendants (only its own value node), is zero.
the subtree depth of a node, P, with immediate descendants D1, D2, . . . is equal to the maximum subtree depth of any descendant, plus 1.

FIG. 4 illustrates the assignment of subtree depths notated as "sd=" in the Figure. Note that subtree depths are only assigned to tags, not to their values.

The absolute depth of a node is defined as follows:
the absolute depth of the root of the tree is zero.
the absolute depth of any node, D, with parent P, is equal to the absolute depth of the parent node, plus 1.

Given these definitions, the method used by the query engine for assigning codes to a tree is as follows:
1) Assign code zero to the root node.
2) Start with the children of the root node, descend the tree in depth-first, left-to-right order.
3) For each node visited, N, with parent P and parent's code Cp:

3a) If the subtree depth of N is greater than 2 then assign a new code, Cn=newcode(Cp) to this node N.
3b) If the subtree depth of N equals 2 then assign a new code, Cn=newcode(Cp) to this node N, and all descendants of N, recursively.
3c) If the subtree depth of N is less than 2 and this is the first subtree of depth less than 2 encountered under parent P, then assign a new code Cpshared=newcode(Cp) to serve as a "shared code" for this parent. Then assign Cpshared as the code for N, and all descendants of N.
3d) If the subtree depth of N is less than 2 and this is not the first subtree of depth less than 2 encountered under parent P, then a code, Cpshared, for parent P already exists. Assign Cpshared as the code for N, and all descendants of N.

This method results in codes being assigned such that:
All nodes in any single subtree of subtree depth 2 or less share a single common code generated as a new code based on the parent's code. This is illustrated as the circled nodes 430 in FIG. 4.
Furthermore, in a collection of related subtrees of depth 1 or 0, being related by having a common parent, all nodes in those subtrees share a single common code generated as a new code based on the common parent's code. This is illustrated as the circled nodes 440 in FIG. 4.

Using these encoding procedures allows the element encodings to be presented as packets of information nearly a factor of 100 times smaller than prior techniques since each node will not require separate binary numbers, thereby improving speed and performance during the searches.

Figure 3:
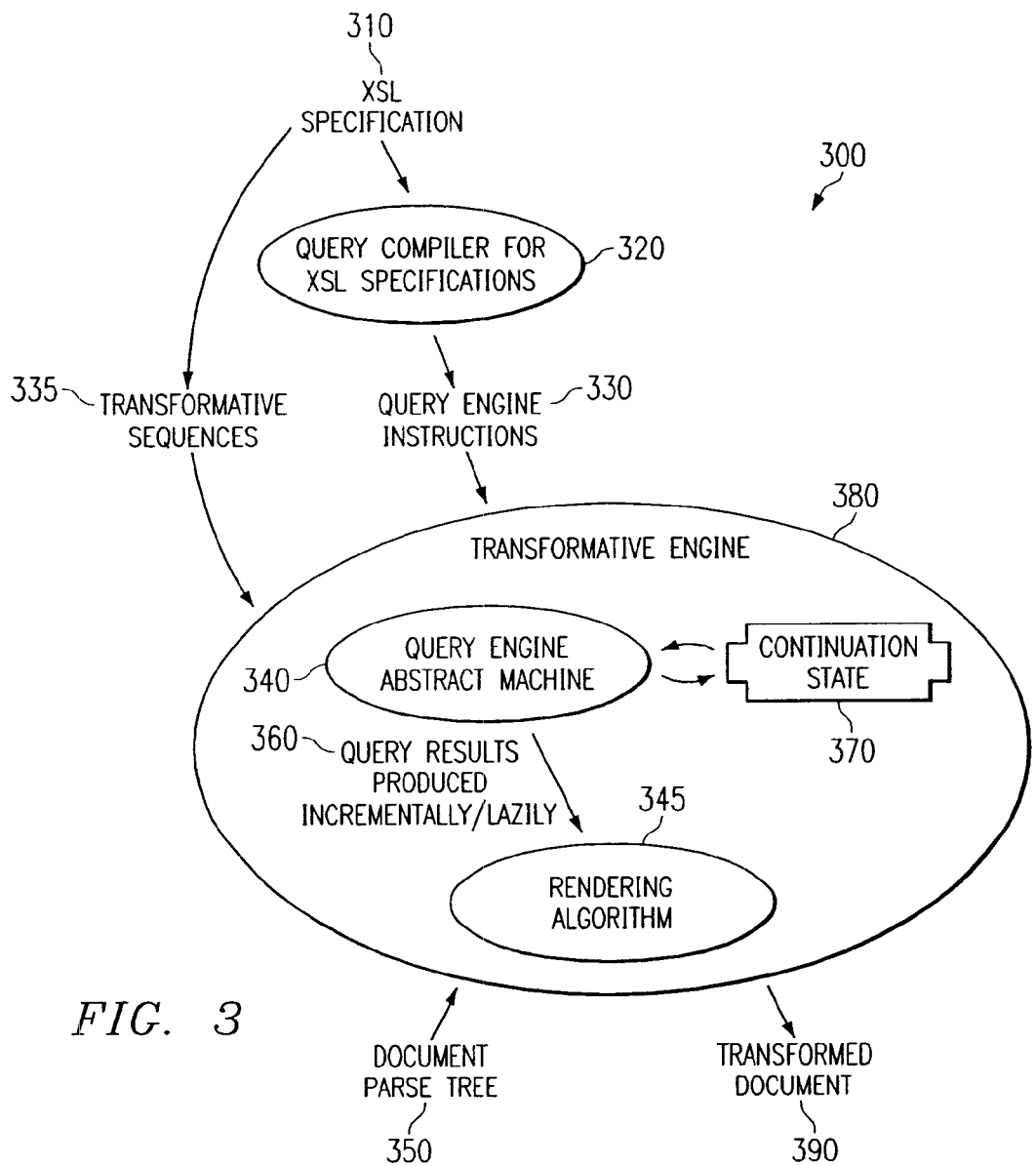
FIG. 3 is a relationship diagram showing the Query Engine incorporated into a Transformation Processing Engine.
Figures 7, 8:
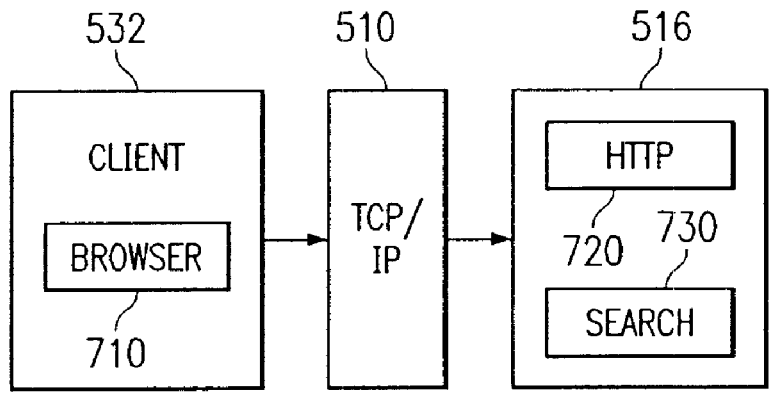
FIG. 7 is a process for searching and displaying a Web document.
FIG. 8 is an example program of an XSL transformation.

FIG. 3 is a relationship diagram 300 showing the query engine incorporated into a transformative sequence processor. The user will supply a transformative sequence 310 in the form of an XSL specification. XSL is a standard in development by the World Wide Web Consortium (W3C). FIG. 8 is an example of an XSL transformation specification. First, the XSL tag is defined 800. Within the XSL tag, a rule tag is defined 810. The rule tag is composed of two elements, a Pattern 820 and an Action 830. The Pattern defines a set of items at which the transformative function implements the Action. In FIG. 8, the Pattern is defined as a title tag 840 when it occurs under a chapter tag 850, which itself occurs a book tag 860, should be transformed into an <H4> tag 870, when a document (or subdocument) containing it is rendered.

Note that XSL specifications may contain multiple rules, patterns, and actions; in this simple example only one rule with one pattern and one action is shown.

Referring back to FIG. 3, the XSL specification 310 is compiled by Query Compiler 320 into Query Engine Instructions 330. During compilation, only the pattern of the XSL rule is compiled. In FIG. 8, the pattern is compiled with the <title> tag 840 becomes a tag value in the query engine instruction as previously described for step 221 in FIG. 2.

The Action 830 of the XSL transformation rule is not compiled during this sequence, and instead is supplied directly 335 to the transformative engine 380, along with the compiled query engine instructions 330. A document parse tree 350 is also input into the transformative engine 380.

The transformative engine includes a Query Engine Abstract Machine 340 and a Rendering Algorithm 345. The query engine abstract machine 340 incrementally produces query results 360 that are input into the rendering algorithm 345. The Continuation State 370 produced by the query engine abstract machine is also held within the transformative engine.

The transformative engine uses the query engine to determine which nodes match the patterns in the XSL specification. As incremental results are supplied by the query engine, the transformation engine applies the appropriate matching transformation actions (830) to the query engine results. Transformed document 390 is output from the transformative engine 380.

WORLD WIDE WEB EXAMPLE

An example of the preferred embodiment of the query and transformation sequence can be viewed in the context of the World Wide Web and the various markup languages that are associated with the Web although other embodiments address non-networked computer databases. A 'web browser' is traditionally defined as a computer program which supports the displaying of documents, presently most of which include Hypertext Markup Language (HTML) formatting markup tags (discussed further below), and hyperlinking to other documents, or phrases in documents, across a network. In particular, web browsers are used to access documents across the Internet's World Wide Web. The discussion of the present invention defines both 'web browser' and 'browser' to include browser programs that enable accessing hyperlinked information over the Internet and other networks, as well as from magnetic disk, compact disk, read-only memory (CD-ROM), or other memory, and does not limit web browsers to just use over the Internet. A number of web browsers are available, some of them commercially. Any viewer of the World Wide Web will typically use a web browser. Indeed, a viewer viewing documents created by the present invention normally uses a web browser to access the documents that a database provider may make available on the network. Web browsers allow clicking on "hot areas" (generated by source anchors containing a document reference name and a hyperlink to that document so that clicking on the hot area causes the specified document to be downloaded over the network and displayed for the viewer). Most web browsers also maintain a history of previously used source anchors and display a hot area which allows hyperlinking back to the database provider's home page (or back through the locations the viewer has previously "visited") so the viewer can always go back to a familiar place.

A viewer and a server, which is where web documents are contained, communicate using the functionality provided by Hypertext Transfer Protocol (HTTP). The Web includes all the servers adhering to this standard which are accessible to clients via Uniform Resource Locators (URL's). For example, communication can be provided over a communication medium. In some embodiments, the client and server may be coupled via Serial Line Internet Protocol (SLIP) or Transmission Control Protocol/Internet Protocol (TCP/IP) connections for high-capacity communication. The web browser is active within the client and presents information to the user.

One way of organizing information on the Internet in order to minimize download time has been to provide users with an overview interface, called a 'home page,' to the information. Although a home page is often merely used as a visually interesting trademark, the home page typically contains a key topic summary of the information provided by one author or database provider, and hyperlinks that take a viewer to the information the viewer has chosen.

A 'hyperlink' is defined as a point-and-click mechanism implemented on a computer which allows a viewer to link (or jump) from one screen display where a topic is referred to (called the 'hyperlink source'), to other screen displays where more information about that topic exists (called the 'hyperlink destination'). These hyperlinked screen displays can be portions of the media data (media data can include, e.g., text graphics, audio, video, etc.) from a single data file, or can be portions of a plurality of different data files; these can be stored in a single location, or at a plurality of separate locations. A hyperlink thus provides a computer-assisted way for a human user to efficiently jump between various locations containing information.

Finally, to support the Internet and the World Wide Web, a markup language called HTML was developed. HTML has two major objectives. First, HTML provides a way to specify the structural elements of text (e.g., this is a heading, this is a body of text, this is a list, etc.) using tags which are independent of the content of the text. A web browser uses these tags to format the displayed text for the particular display device of a particular viewer. So, for example, HTML allows an author to specify up to six levels of heading information bracketed by six different heading-tag pairs. Applications (e.g., web browsers) on different computers then process the HTML documents for visual presentation in a manner customized for particular display devices. An application on one computer could display a level 1 heading as 10 point bold Courier while an application on another computer could display it as a 20 point italic Times Roman. A level 1 sequence is heralded with the sequence token </h1>. Thus, a heading might be displayed as:

<h1> This is a level 1 heading </h1> for a level one heading or

<h4> this is a level 4 heading </h4> for a level 4 heading. As a markup language, HTML enables a document to be displayed within the capabilities of any particular display system even though that display system does not support italic, or bold, color, or any particular typeface or size. Thus HTML supports writing documents so they can be output to everything from simple monospaced, single-size fonts to proportional-spaced, multiple-size, multiple-style fonts. Each computer program that accesses an HTML document can translate that HTML document into a display format supported by the hardware running the program.

On the World Wide Web, the documents being generated are typically done in HTML. HTML defines hypertext structure within basic limits. It allows a programmer to define a link but it does not allow for differentiation between links or sublinks. An HTML document cannot be parsed into a multi-stage tree. In addition, differing tags cannot be defined in HTML, which reduces its flexibility.

These limitations to HTML are presently being addressed. One of the options is the Standard Generalized Markup Language ("SGML"). HTML can actually be viewed as a subset of SGML. SGML defines a language for use in presenting any form of information. However, SGML presents so many options for defining tags and presenting information that it is very difficult to use in standardizing a way for defining and presenting documents and their contents.

The difficulties in using SGML have led to the development of a hybrid, which would contain the advantages of SGML and HTML. This new language for establishing documents on the World Wide Web is the "Extensible Markup Language" (known as "XML"), which is termed extensible because it is not a fixed format like HTML. XML is designed to allow the use of SGML on the World Wide Web but with some limitations on the options that SGML provides. Basically, XML allows a programmer to devise his or her own set of markup elements. XML documents can be accessed through document type definition (DTD) or DTD-less operations. DTD is usually a file, which contains a formal definition of a particular type of document. This sets out what names can be used for elements, where they may occur and how they all fit together. Basically DTD is a formal language that allows the processors to parse a document and define the interrelations of the elements within an XML document. However, an XML document has additional flexibility since it can define its own markup elements by the existence and location of elements where created thereby allowing DTD-less reading. Pure SGML documents typically would require a DTD file to assist in the translation.

Even for XML documents, the reader must have the ability to efficiently find and retrieve more information about any particular item in a document. Presently, the query engines that exist for XML are comparatively slow. As noted earlier, these search engines rely on a node by node search ("node travel") of an XML document that consists of examining the nodes. If the node has a leaf with the requested information, the engine will access the information. If the node does not have the information, the search will then move down to the node child and perform the same analysis. This type of search is time-consuming. In addition, these search engines do not have the capability to accept directions from non-XML compatible web browsers or present the information in a format compatible to such a web browser.

Figure 5:
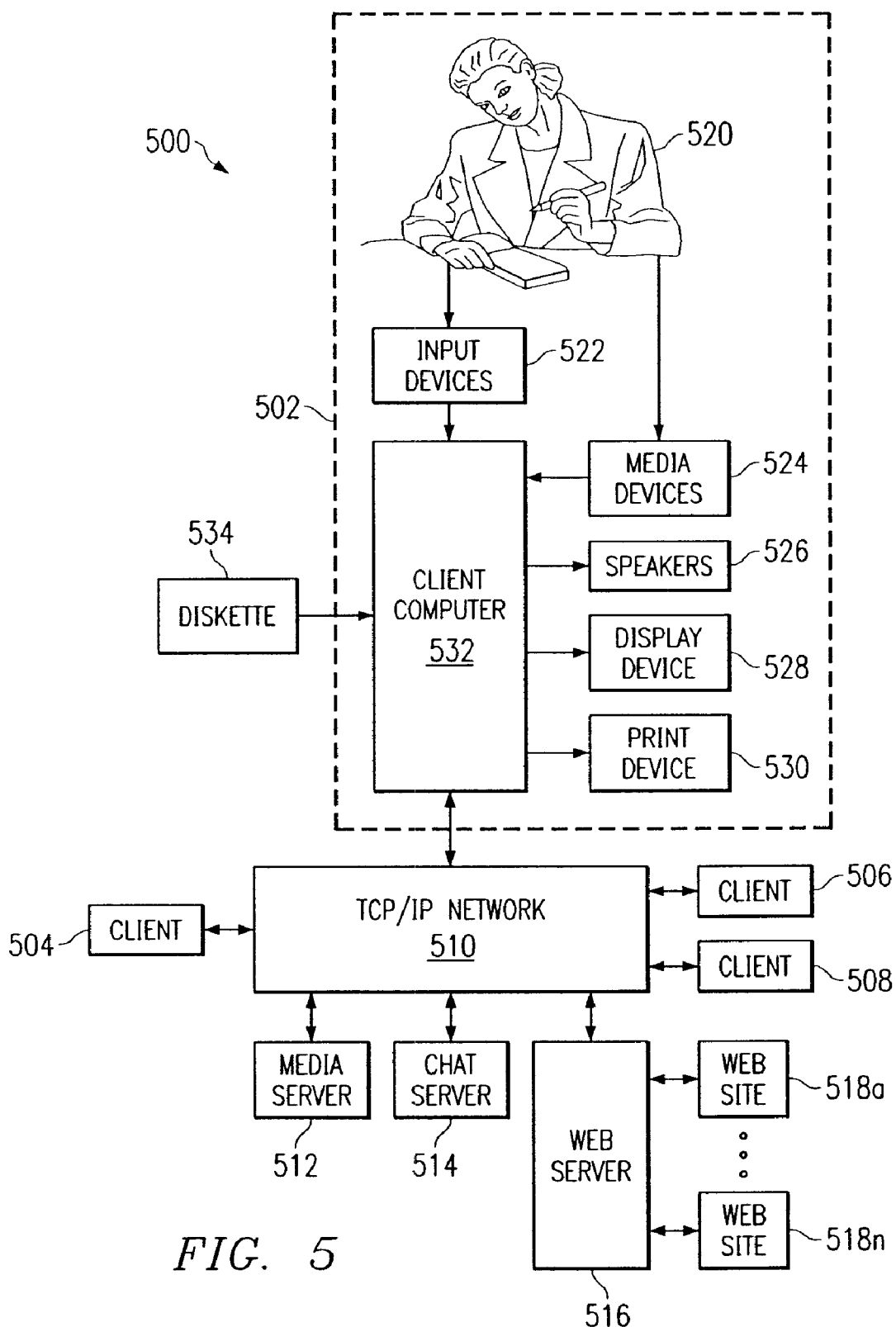
FIG. 5 is a block diagram of a computer network.

FIG. 5 is a block diagram of a system, indicated generally at 500, according to the illustrative embodiment. System 500 includes a TCP/IP network 510, a real media server computer 512 for executing a real media server process and a web server computer 516 for executing a Web server process. Web server 516 contains multiple web site 518*a–n*, as shown in FIG. 5.

Moreover, as shown in FIG. 5, each of servers 512, 514 and 516 is coupled through TCP/IP network 510 to each of clients 502, 504, 506 and 508. Through TCP/IP network 510, information is communicated by servers 512, 514 and 516, and by clients 502, 504, 506 and 508 to one another.

Clients 502, 504, 506 and 508 are substantially identical to one another. Client 502 is a representative one of clients 502, 504, 506 and 508. Client 502 includes a user 520, input devices 522, media devices 524, speakers 526, a display device 528, a print device 530 and a client computer 532. Client computer 532 is connected to input devices 522, media devices 524, speakers 526, display device 528, print device 530 and diskette 534. Display device 528 is, for example, a conventional electronic cathode ray tube. Print device 530 is, for example, a conventional electronic printer or plotter.

User 520 and client computer 532 operate in association with one another. For example, in response to signals from client computer 530, display device 528 displays visual images, and user 520 views such visual images. Also, in response to signals from client computer 532, print device 530 prints visual images on paper, and user 520 views such visual images. Further, in response to signals from client computer 532, speakers 526 output audio frequencies, and user 520 listens to such audio frequencies. Moreover, user 520 operates input devices 522 and media devices 524 in order to output information to client computer 532, and client computer 532 receives such information from input devices 522 and media devices 524.

Input devices 522 include, for example, a conventional electronic keyboard and a pointing device such as a conventional electronic mouse, rollerball or light pen. User 520 operates the keyboard to output alphanumeric text information to client computer 532, and client computer 532 receives such alphanumeric text information from the keyboard. User 520 operates the pointing device to output cursor-control information to client computer 532, and client computer 532 receives such cursor-control information from the pointing device.

User 520 operates media devices 524 in order to output information to client computer 532 in the form of media signals, and client computer 532 receives such media signals from media devices 524. Media signals include for example video signals and audio signals. Media devices 524 include, for example, a microphone, a video camera, a videocassette player, a CD-ROM player, and an electronic scanner device.

A web browser typically is loaded onto a client computer and is launched by the client computer when accessing the World Wide Web. The web browser is used for accessing Web sites 518 (*a–n*) through the web server 516.

The advantages of a web browser on a network such as the Internet is that any of the documents viewed with the program may be located (or scattered in pieces) on any computer connected to network 510. The viewer can use a mouse 522, or other pointing device, to click-on a hot area, such as highlighted text or a button, and cause the relevant portion of the referenced document to be downloaded to the viewer's computer 532 for viewing. These downloaded documents in turn can contain hyperlinks to other documents on the same or other computers. 'Downloading' is defined as the transmitting of a document or other information from the an array of web sites 518*a* through 518*n* over a network 510 to the viewer's computer 532.

As noted earlier, information is presented to World Wide Web viewers as a collection of 'documents' and 'pages'. As mentioned above, a 'document' is defined in a broad sense to indicate text, pictorial, audio, video and other information stored in one or more computer files. Viewing such multimedia files can be much like watching television. Documents include everything from simple short text documents to large computer multi-media databases.

A 'page' is defined as any discrete file, which can be downloaded as a single download segment. Technically, a web browser does not recognize or access documents per se, but instead accesses pages. Typically, a web browser downloads one page as the result of clicking on a hot area. A page often has several source anchors with hyperlinks to various other pages or to specific locations within pages.

One problem with accessing documents over the Internet is that many documents are quite long, and thus can take quite some time to download over the network. This means that viewers are often reluctant to access a document unless they know it will be useful. FIG. 6 shows the typical information available at a web site. A web site 600 might contain a number of internal lines 610 and/or sections with multiple pages. The presentation of text and or graphics 620 on a web site 600 is defined by a markup language. A page is thus a document, which contains a portion of a source document.

FIG. 7 shows a process for displaying/searching a web document using a web browser. A session typically commences when the HTTP server detects a request for a client connect. After connection, a simple query can be implemented through the web browser. In the prior art, such a query would usually just include a term to be found in the Web document. Then, the requested page, typically the home page, is displayed on the client browser. As noted above, the client and server may be coupled via a TCP/IP connection. Active within the client 532 is the web browser 710, which establishes the connection with the web server 516. The web server 516 executes the corresponding server software which presents information to the client in the form of HTTP responses 720. The HTTP responses correspond to Web pages represented using markup language. In this embodiment, the markup language is XML. The web browser will activate the search engine 730 on the web server.

The XML versions of articles are searched for the presence of specified search terms, if the web browser is compatible. If the web browser is not compatible, the XML results are converted to a compatible format. The XML results of these search requests can then be displayed on the client's console.

The transformative process on a server is called a server-side transformation. If the browser is XML/XSL-enabled MS IE4 is an example, then server-side transformations need not be implemented on the server since the browser has XML/XSL capabilities. If the browser is not XML/XSL-enabled, and there are commands that can be provided to transform information, then server-side transformation is implemented. As a matter of fact, there may be multiple transformation (XSL) specifications for a variety of formats on each server. The server will enable the appropriate XSL specification given the available browser information; i.e., if the browser is not XML-enabled but is CSS (cascading style sheets)-enabled, the server-side transformations using the "CSS" XSL specification will be implemented, and if the browser is not even CSS-enabled then a "raw HTML" XSL specification can be used, and so forth.

These capabilities are very "back end" oriented, in the sense that they constitute implementation details of commands on the server, as opposed to having graphical manifestation on the GUI of the client computer. The following is an example of the transformation and query process using the following XML document:

<MYDOC>
<SEC>
Section 1 content . . .
<PAR>
Paragraph 1 content . . .
</PAR>
<PAR>
Paragraph 2 content . . .
</PAR>
etc.
<SEC>
<SEC color-blue>
Section 2 content . . .
etc.
<SEC>
</MYDOC>

The corresponding example query expressions are:
"<SEC>(1) WHERE (COLOR="BLUE") UNDER <MYDOC>"
which fetches the first section whose color attribute is blue and which is located under MYDOC . . . and
"<PAR>(2) 2 LEVELS UNDER <MYDOC>"
which fetches the second paragraph, which must be exactly two levels under MYDOC.

Therefore, in a preferred server side embodiment, the server does not have to depend on XML DTDs with the preferred query and transformative engine in order to present information to a user either in an HTML, XML or other markup format.

In such a preferred embodiment, the XML query and transformative engine is located on the server to perform server-side tranformations. The XML and query engine allows XML/XSL-enabled browsers to access the XML documents on the server, whereas those browsers not enabled with XML will have the XML documents on the server transformed into a presentation format acceptable by the browser.

This is a unique approach, which allows a Web site user to have control of the content through their queries, and based on the user's browser and client computer. This server side embodiment therefore allows for access to XML documents for many of the web browsers on the market.

Again, referring back to FIG. 4, which depicts the potential tree ordering of an XML document. In this tree, each leaf contains presentable material. Each individual leaf is defined as a child of a certain number of branches. These branches are labeled as tags. The title for the play Hamlet would be a leaf. The Hamlet leaf would be child of the "Title" branch of the "Play" branch. Therefore, a user requesting a search for the title of the play [<title> under <play>] would receive the term Hamlet in node 408 and would not receive the term Prologue from node 412. The convenience of XML is that it is able to allow a user to define a number of its own tags and therefore categorize leafs with a greater level of detail.

The implementation of XML documents on a Web site does lead to a number of potential problems. With HTML as the primary language of use on Web sites and with a majority of web browsers, many users with such browsers will not be able to access information coded in XML.

In order to allow such access by HTML based web browsers, a transformative sequence is integrated with the query engine so that based on the web browser used to access the Web site, a certain transformative sequence will be implemented. The transformative sequence will then access a set of XSL transformative rules that will establish the display for the XML information into the necessary format.

It should be appreciated by those skilled in the art that the specific embodiments disclosed above may be readily utilized as a basis for modifying or designing other methods for carrying out the same purposes of the present invention. It should also be realized by those skilled in the art that such equivalent constructions do not depart from the spirit and scope of the invention as set forth in the appended claims.

We claim:

1. A method of processing a query for a textual document in a tagged-based language comprising:
   providing an abstract machine for searching a tree representation of the document, wherein:
      the abstract machine has an instruction set having an ability to produce at least a portion of results;
      the tree representation has levels; and
      all nodes at a same level have a same code;
   compiling a query in a language into instructions for the abstract engine;
   running the instructions on the abstract machine, wherein running is performed on the tree representation; and
   receiving the at least a portion of results from the instructions that have been run.

2. The method of claim 1, wherein running the instructions is performed on a first portion of an item selected from a group consisting of a memory and a database.

3. The method of claim 2, further comprising running the instructions on a second portion of the item, wherein this act is performed after receiving the at least a portion of results.

4. The method of claim 1, wherein the tree structure includes child nodes, wherein each child node is a descendant from only one parent node.

5. The method of claim 1, further comprising:
obtaining a code for a particular node, wherein the code has been assigned by:
determining a subtree depth for the particular node within the tree representation;
determining a parent-child relationship for the particular node and for each node, if any, within the tree representation that lies between the particular node and a root node; and
determining a code for the particular node, wherein:
if the subtree depth of the particular node is less than two, the code for the particular node is a code for its closest parent node having a subtree depth of at least two; and
if the subtree depth of the particular node is at least two, the code for the particular node is selected such that when bitwise binary ANDed with a code of a parent node yields the code of the parent node, wherein the codes for the particular node and the parent node are different from each other; and
using the code as part of the query.

6. The method of claim 5, wherein the subtree depth of the particular node is less than two.

7. The method of claim 5, wherein the subtree depth of the particular node is least two.

8. A computer program product for performing a method of processing a query for a textual document in a tagged-based language, the method comprising:
providing an abstract machine for searching a tree representation of the document, wherein:
the abstract machine has an instruction set having an ability to produce at least a portion of results;
the tree representation has levels; and
all nodes at a same level have a same code;
compiling a query in a language into instructions for the abstract engine;
running the instructions on the abstract machine, wherein running is performed on the tree representation; and
receiving the at least a portion of results from the instructions that have been run.

9. The computer program product of claim 8, wherein running the instructions is performed on a first portion of an item selected from a group consisting of a memory and a database.

10. The computer program product of claim 9, wherein the method further comprises running the instructions on a second portion of the item, wherein this act is performed after receiving the at least a portion of results.

11. The computer program product of claim 8, wherein the tree structure includes child nodes, wherein each child node is a descendant from only one parent node.

12. The computer program product of claim 8, wherein the method further comprises:
obtaining a code for a particular node, wherein the code has been assigned by:
determining a subtree depth for the particular node within the tree representation;
determining parent-child relationships for the particular node and for each node, if any, within the tree representation that lies between the particular node and a root node; and
using a code for the particular node; wherein
if the subtree depth of the particular node is less than two, the code for the particular node is a code for its closest parent node having a subtree depth of at least two; and
if the subtree depth of the particular node is at least two, the code for the particular node is selected such that when bitwise binary ANDed with a code of a parent node yields the code of the parent node, wherein the codes for the particular node and the parent node are different from each other; and
using the code as part of the query.

13. The computer program product of claim 12, wherein the subtree of the particular node is less than two.

14. The computer program product of claim 12, wherein the subtree of the particular node is at least two.

* * * * *